United States Patent
Gale et al.

(10) Patent No.: US 8,934,855 B2
(45) Date of Patent: Jan. 13, 2015

(54) ANTENNA AUTO-CONFIGURATION

(75) Inventors: Simon John Gale, Bishops Stortford (GB); Steven Raymond Hall, Harlow (GB); Andrew James Urquhart, Bishops Stortford (GB)

(73) Assignee: Apple Inc., Cupertino, CA (US)

( * ) Notice: Subject to any disclaimer, the term of this patent is extended or adjusted under 35 U.S.C. 154(b) by 810 days.

(21) Appl. No.: 12/269,236

(22) Filed: Nov. 12, 2008

(65) Prior Publication Data

US 2010/0120415 A1    May 13, 2010

(51) Int. Cl.
| | |
|---|---|
| H04B 17/00 | (2006.01) |
| H04W 24/00 | (2009.01) |
| H04M 1/00 | (2006.01) |
| G01S 3/16 | (2006.01) |
| H04W 24/06 | (2009.01) |
| H01Q 1/12 | (2006.01) |
| H01Q 3/26 | (2006.01) |
| H04W 28/04 | (2009.01) |
| H04W 88/08 | (2009.01) |
| H04W 36/08 | (2009.01) |
| H04W 16/02 | (2009.01) |

(52) U.S. Cl.
CPC .............. *H04W 24/06* (2013.01); *H04W 28/04* (2013.01); *H04W 88/08* (2013.01); *H04W 36/08* (2013.01); *H04B 17/0057* (2013.01); *H04W 24/00* (2013.01); *H01Q 1/1257* (2013.01); *H04W 16/02* (2013.01); *H01Q 3/267* (2013.01)
USPC ...................... 455/115.3; 455/424; 455/562.1; 342/378

(58) Field of Classification Search
CPC ............... H04B 17/00; H04B 17/0017; H04B 17/0022; H04B 17/0025; H04B 17/0032; H04B 17/0042; H04B 17/0057; H04W 24/00; H04W 24/02; H04W 24/04; H04W 24/06; H04W 24/08; H04W 28/04; H01Q 1/1257; H01Q 3/267; G01R 31/02; G01R 31/041; G01R 31/08

USPC ........................... 455/64.14, 115.2, 423–424, 455/67.11–67.7, 115.1–115.4, 561–562.1, 455/272, 226.1–226.4, 132–133; 342/359–361, 378–384, 423
See application file for complete search history.

(56) References Cited

U.S. PATENT DOCUMENTS

| | | | | |
|---|---|---|---|---|
| 5,898,828 | A  * | 4/1999 | Pignolet et al. | ................. 714/6.1 |
| 6,266,528 | B1 * | 7/2001 | Farzaneh | ...................... 455/423 |

(Continued)

FOREIGN PATENT DOCUMENTS

| | | |
|---|---|---|
| CN | 101217303 | 7/2008 |
| EP | 1592274 A2 | 11/2005 |

(Continued)

OTHER PUBLICATIONS

Search Report and Written Opinion in PCT/EP2009/065032, Jun. 29, 2010.

(Continued)

*Primary Examiner* — Michael Mapa
(74) *Attorney, Agent, or Firm* — Meyertons, Hood, Kivlin, Kowert & Goetzel, P.C.

(57) ABSTRACT

A base station for use in a mobile telephony network includes an antenna arrangement coupled to a transceiver arrangement for producing a plurality of beams. A method of testing the base station comprises detecting at the transceiver arrangement the signal strengths of a test signal received via the beams; comparing and/or correlating the said signal strengths detected at the transceiver arrangement; and using the results of the comparisons and/or correlations to determine the configuration of the antenna arrangement and transceiver arrangement and/or to detect faults. The comparison of average signal strengths can be used to detect cabling faults, and beam errors. The correlation of un-averaged signal strengths can be used to determine which beams have the same polarization. Beam pointing directions and the allocation of antennas to sectors can be determined by monitoring handovers of mobiles moving between cells. Frequencies may be allocated to sectors according to a frequency re-use scheme.

32 Claims, 15 Drawing Sheets

(56) References Cited

U.S. PATENT DOCUMENTS

| | | | |
|---|---|---|---|
| 6,587,686 B1* | 7/2003 | Cuffaro et al. | 455/423 |
| 6,597,927 B1* | 7/2003 | Eswara et al. | 455/562.1 |
| 7,474,895 B1* | 1/2009 | Jiang et al. | 455/447 |
| 2002/0002066 A1* | 1/2002 | Pallonen | 455/562 |
| 2002/0071406 A1* | 6/2002 | Bursztejn et al. | 370/334 |
| 2003/0003959 A1* | 1/2003 | Tsui et al. | 455/561 |
| 2003/0092402 A1* | 5/2003 | Shapira et al. | 455/101 |
| 2004/0011868 A1* | 1/2004 | Backlund et al. | 235/383 |
| 2006/0135164 A1* | 6/2006 | Kim et al. | 455/436 |
| 2007/0054698 A1* | 3/2007 | Ding et al. | 455/561 |
| 2007/0254717 A1* | 11/2007 | Yahagi | 455/562.1 |
| 2008/0119197 A1* | 5/2008 | Skarby | 455/446 |
| 2008/0204320 A1* | 8/2008 | Leonard | 342/378 |
| 2008/0233865 A1* | 9/2008 | Malarky et al. | 455/12.1 |
| 2009/0264119 A1* | 10/2009 | De Pomian | 455/424 |
| 2010/0231449 A1* | 9/2010 | Jacobs | 342/359 |

FOREIGN PATENT DOCUMENTS

| | | |
|---|---|---|
| JP | 09307492 | 11/1997 |
| JP | 2000022622 | 1/2000 |
| JP | 2000183795 | 6/2000 |
| JP | 2001127680 | 5/2001 |
| JP | 2004-289220 | 10/2004 |
| JP | 2006186916 | 7/2006 |
| WO | WO-02/01732 A2 | 1/2002 |
| WO | WO-2008/029413 A2 | 3/2008 |
| WO | 2008041281 | 4/2008 |

OTHER PUBLICATIONS

First Office Action and translation thereof in related Chinese Patent Application No. 200980153127.4, May 28, 2013, pp. 1-28.

Office Action from Japanese Patent Application No. 2011-536010, mailed Jun. 14, 2013, (English Translation and Japanese Versions), pp. 1-16.

Examination Report of Apr. 5, 2012 in EP09775125.9.

Decision to Grant from Japanese Patent Application No. 2011536010, issued Jun. 2, 2014, English and Japanese versions, pp. 1-8.

Notice of Allowance from Korean Application No. 1020117013432, issued Sep. 11, 2014, English and Korean versions, pp. 1-9.

* cited by examiner

|    | P1 | P2          | P3 | P4          | P5 | P6          |
|----|----|-------------|----|-------------|----|-------------|
| P1 | X  | W12, W21    | X  |             |    | W61, W16    |
| P2 | X  | X           |    |             |    |             |
| P3 | X  | X           | X  | W24, W42    |    |             |
| P4 | X  | X           | X  | X           |    | W46, W64    |
| P5 | X  | X           | X  | X           | X  |             |
| P6 | X  | X           | X  | X           | X  | X           |

Figure 4

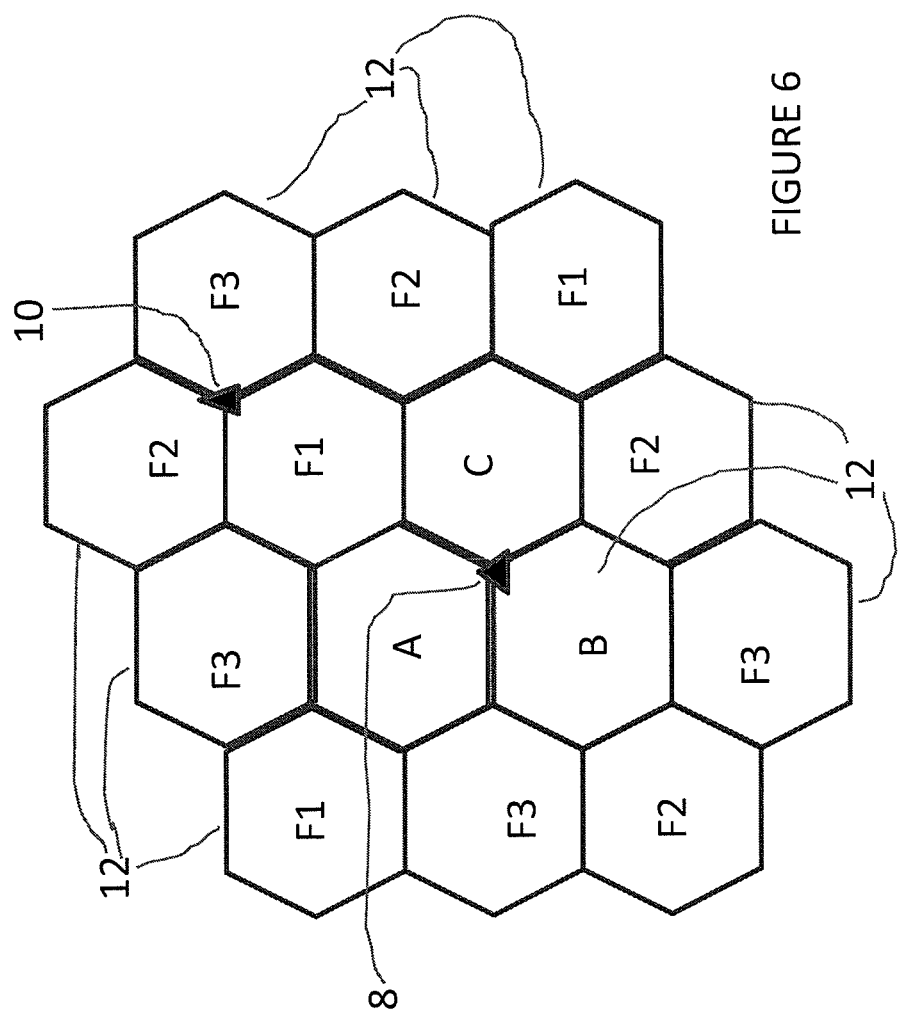

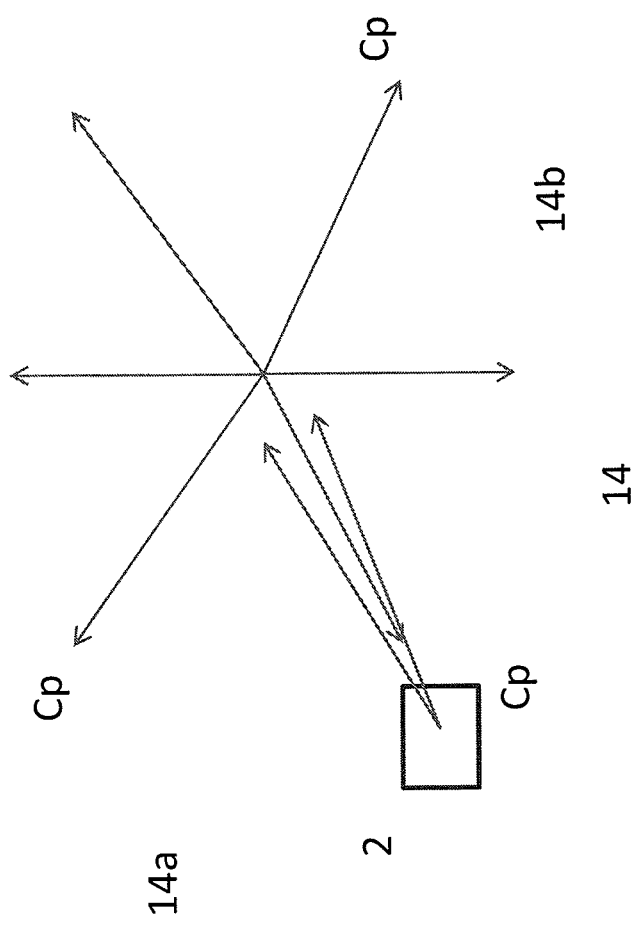

ND AUTO-CONFIGURATION

FIELD OF THE INVENTION

The present invention relates to mobile telephony. Embodiments of the invention relate to testing base stations of mobile telephony networks and to determining the configuration of a base station for use in a mobile telephony network.

BACKGROUND OF THE INVENTION

Mobile telephony networks are well known. Mobile telephony systems, in which user equipment such as mobile handsets communicate via wireless links to a network of base stations connected to a telecommunications network, have undergone rapid development through a number of generations. The initial deployment of systems using analogue modulation has been superseded by second generation digital systems, which are themselves currently being superseded by third generation digital systems such as UMTS and CDMA. Third generation standards provide for a greater throughput of data than is provided by second generation systems; this trend is continued with the proposal by the Third Generation Partnership Project of the so-called Long Term Evolution system, often simply called LTE, which offers potentially greater capacity still, by the use of wider frequency bands, spectrally efficient modulation techniques and potentially also the exploitation of spatially diverse propagation paths to increase capacity (Multiple In Multiple Out). Typically such cellular wireless systems comprise user equipment such as mobile telephony handsets or wireless terminals, a number of base stations, each potentially communicating over what are termed access links with many user equipments located in a coverage area known as a cell, and a two way connection, known as backhaul, between each base station and a telecommunications network such as the PSTN.

A base station typically comprises a tower supporting antennas. The antennas are connected by cables to signal processors. Each signal processor includes a radio transceiver and other signal processing equipment. The signal processors are typically housed in a cabinet or other housing at ground level. The antennas are typically assigned to respective sectors around the tower and more than one antenna is typically provided per sector. For example there may be three pairs of antennas and three sectors at 120 degrees angular separation, corresponding to a cell with the result that one tower serves three sectors. The multiple antennas typically have the same radiation pattern and provide coverage for user terminals in the same area. In order to provide for independence of multiple radio propagation paths between the base station and the user terminal, the antennas may be spaced side-by-side, and/or different radiated signal polarisations may be used. One physical antenna may provide two polarisation channels. Typically, a base station sector will be provided with different polarizations, frequently + and −45 degrees, and further spatial diversity may be provided by a second dual-polar antenna. The diversity benefits arising from the use of multiple antenna channels are due to the differences in superposition or cancellation of multiple reflected signals in the radio propagation path, which cause a localised fading effect. This fading varies independently on the multiple antenna channels, due to their spatial separation or use of different radiated polarisation. When averaged over time, or over small variations in the user terminal position, the mean signal strength received from a user terminal is common. For a common azimuth angle of the user, relative to the base station sector, and for a common path loss to the user terminal, any differences in the mean received signal strength can be assumed to be due to differences in the insertion loss of the base station receiver hardware, or due to differences in the antenna gain pattern.

In some previously proposed base stations the signal processors connected to a diversity pair are associated: for example a pair of signal processors connected to a diversity pair operate at the same frequency and share a local oscillator.

In one example of a mobile telephony network, three different radio frequencies are assigned to the three sectors at a base station cell. Such a frequency re-use scheme applied to all the cells of the network ensures that no two adjacent sectors operate at the same radio frequency. Such a network is described as having a re-use of three. Single frequency networks are also known. LTE systems may be deployed either as single frequency networks, or with re-use of three.

It is important to the functioning of a base station that the configuration of the base station is correct. For example, the beam pointing directions of the antennas and the radiation patterns of the antennas should be correct. A diversity pair should point in the same direction. The beams of adjacent diversity pairs should overlap only to a predetermined extent and at predetermined positions. Furthermore a diversity pair should be connected to an associated pair of signal processors operating at the same frequency. Errors in beam pointing may occur or there may be faults in the antennas or the transceivers connected to them. Furthermore, when constructing a base station, it is not easy to correctly connect the antennas to the signal processors. The antennas are high above the housing of the signal processors and the cables for connecting them are heavy and difficult to manipulate. The height of the tower makes the manipulation of the cables potentially dangerous especially in bad weather. It is easy to incorrectly connect the cables to the antennas and signal processors. Thus there is a need to at least test a base station to determine whether there are faults in its configuration and/or to determine its configuration.

SUMMARY OF THE INVENTION

In accordance with one aspect of the invention, there is provided a method of configuring a base station for use in a mobile telephony network, the base station including antennas coupled to signal processors, the method comprising:

detecting at the signal processors the signal strengths of a test signal received via the antennas;

comparing and/or correlating the signal strengths detected at the signal processors; and using the results of the comparisons and/or correlations to determine the configuration of the antennas and/or of the connections of the antennas to the signal processors and/or faults in the configuration.

The invention also provides a test apparatus for use in a base station of a mobile telephony network, the base station comprising a plurality of signal processors having respective ports for connection by cables to respective antennas, the test apparatus being operable to:

detect the signal strengths of a test signal received at the signal processors via the antennas;

compare and/or correlate the signal strengths detected at the signal processors; and use the results of the comparisons and/or correlations to determine the configuration of the antennas and/or of the connections of the antennas to the signal processors and/or faults in the configuration.

By comparing signal strengths of signals received by the signal processors, it is possible to determine which signal processors are connected to the same diversity pair because the signals should have equal signal strength.

By comparing signal strengths of a signal received at a cusp of the radiation patterns of adjacent antennas, or received by a diversity pair, and which should thus be equal, it is possible to determine whether or not there is a fault, for example a beam pointing error or a beam pattern error.

By correlating signal strengths of signals detected at the signal processors, it is possible to determine which signal processors are connected to channels of the same polarisation.

In accordance with another aspect of the present invention, there is provided a method of determining the configuration of a base station for use in a mobile telephony network, the base station comprising a plurality of diversity pairs of antennas and signal processors having respective ports connected to respective ones of the antennas by respective signal transmission cables, the method comprising a) measuring the signal strength of a test signal received by one signal processor, b) measuring the signal strength of the test signal received by another signal processor, c) comparing the signal strengths received by the said one and another processors, and d) if the compared signal strengths are equal designating the one and another signal processors as being connected to a diversity pair of antennas.

Another aspect of the invention provides a test apparatus for determining the configuration of a base station for use in a mobile telephony network, the base station comprising a plurality of diversity pairs of antennas and signal processors having respective ports connected to respective ones of the antennas by respective signal transmission cables, the test apparatus being operable to a) measure the signal strength of a test signal received by one signal processor, b) measure the signal strength of the test signal received by another signal processor, c) compare the signal strengths received by the said one and another processors, and d) if the compared signal strengths are equal, designate the one and another signal processors as being connected to a diversity pair of antennas.

Thus the test method and apparatus tests how the antennas are connected to the signal processors and indicates which signal processors are connected to the diversity pairs of antennas. Once that is known, any corrections to the connections are carried out, in one example of the invention. In another example of the invention, the frequencies of operation of the signal processors are individually tuneable. So once the signal processors have been associated with the diversity pairs, the frequencies of the signal processors are set, for example in accordance with the frequency re-use scheme of the network.

The directions in which the diversity pairs are pointed may not be known and so the frequencies to be used in the sectors needs to be determined. In an example of the invention, the frequencies are set by selecting one of the sectors, detecting the frequency of operation of a contiguous sector of an adjacent base station and setting the frequencies of the sectors according to the frequency re-use plan of the network, so as to minimise overlapping coverage on a common frequency channel In an implementation of the invention, signal strength is a signal strength averaged over a predetermined period of time allowing for example the different polarisations of a diversity pair to produce equal average signal strengths. "Equal" means equal within a predetermined tolerance range. The averaging period and the tolerance range are a matter of choice by the network operator or designer of the base station.

Further features and advantages of the invention will become apparent from the following description of illustrative embodiments of the invention, given by way of example only, which is made with reference to the accompanying drawings.

BRIEF DESCRIPTION OF THE DRAWINGS

FIG. 4 is an illustrative matrix referred to in FIG. 3C;

FIG. 6 illustrates an example of a known frequency re-use scheme in a mobile telephony network;

FIG. 8 is a schematic diagram illustrating a method of detecting whether antennas are adjacent;

DETAILED DESCRIPTION OF THE INVENTION

This illustrative description of FIGS. 1 to 8 assumes for ease of description that a base station has three sectors, each sector has two physical antennas which form a polarisation diversity pair, and each antenna has a single main beam with a fixed pointing direction. However the invention is not limited to that and as will be described many other arrangements are possible within the scope of the invention.

Determining Cable Configuration

Figure 1:
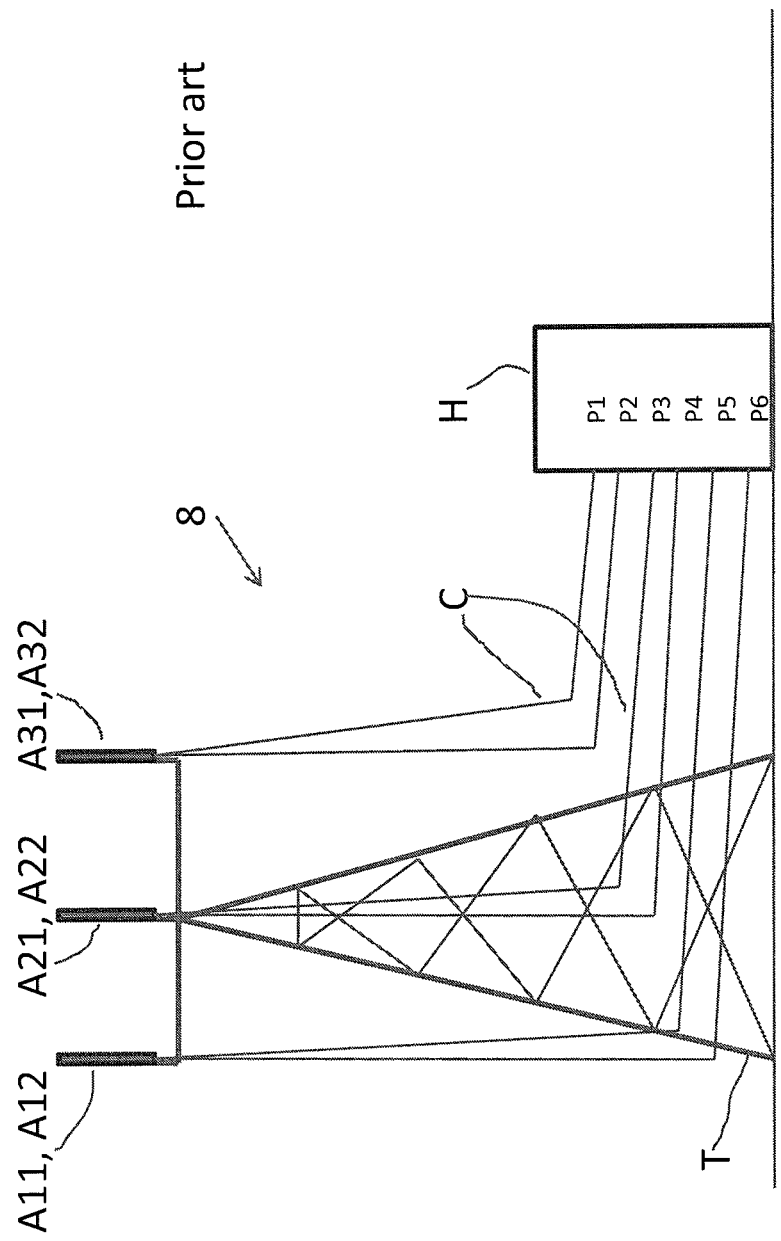
FIG. 1 is a schematic diagram of a base station of a mobile telephony network.
Figure 2:
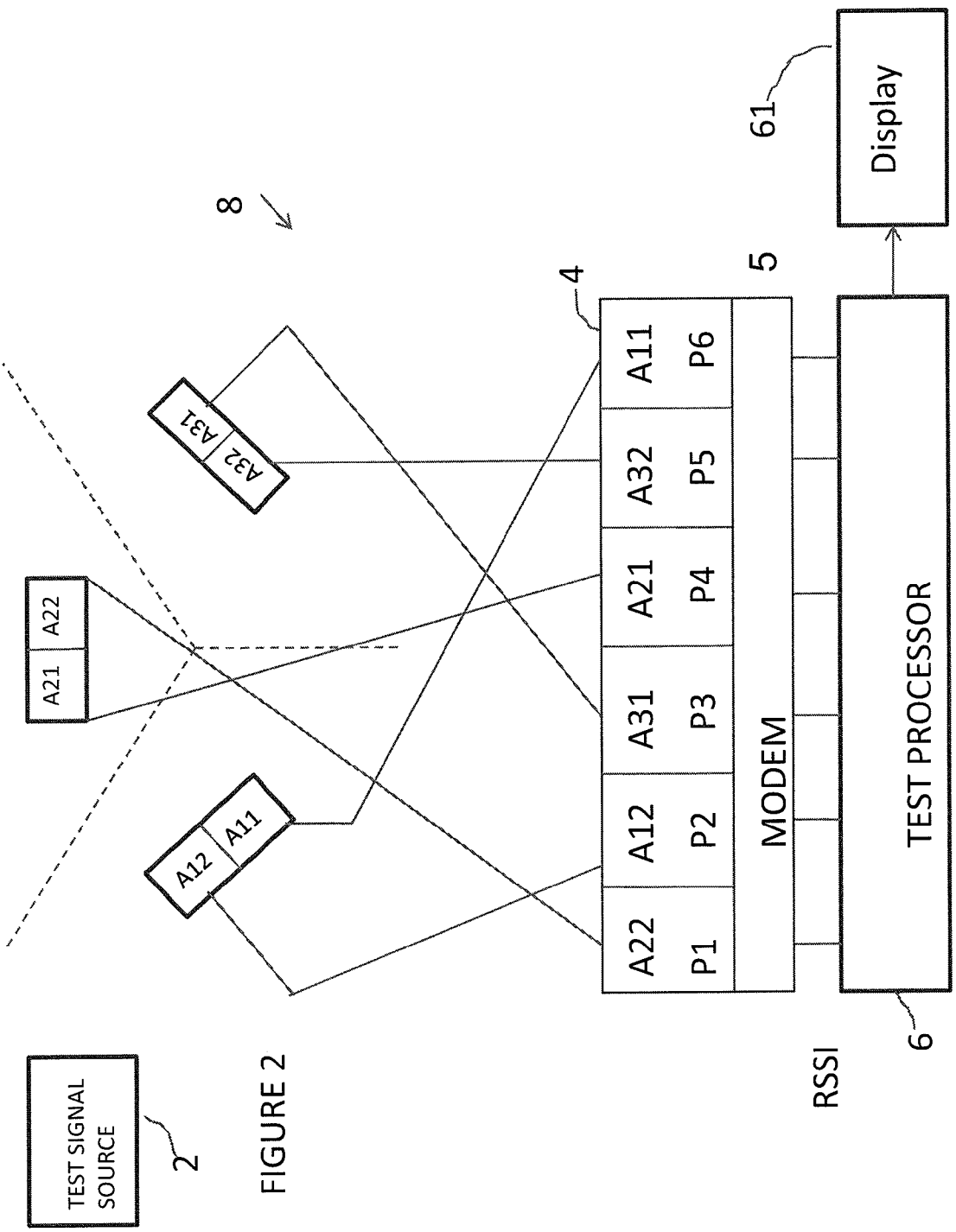
FIG. 2 is a schematic block diagram of an example of a base station having one example of apparatus in accordance with the invention.

Referring to FIG. 1, an example of a conventional base station has a high tower supporting three diversity pairs of antennas: A11, A12; A21, A22; and A31, A32. The antennas of each pair are polarized at orthogonal polarizations for example + and −45 degrees. The six antennas are connected by respective cables to ports P1 to P6 of equipment housed in a cabinet or other housing H at ground level. Each port is connected to a signal processor which includes a radio transceiver and other signal processing circuitry. In the base station of FIG. 1 the antennas are connected in a predetermined fashion to the ports; for example it is determined in advance that diversity pair A31, A32 is connected to ports P1 and P2 and thus to a pair of signal processors the transceivers of which, in this example, share the same local oscillator and thus operate at the same frequency which is the frequency chosen according to the frequency re-use plan of the network for the sector associated with the diversity pair A31, A32. FIG. 2 shows the diversity pairs in sectors indicated by dash lines which also indicate the boundaries between adjacent cells. A base station may have other numbers and arrangements of antennas and sectors as will be described in more detail herein below.

It has been found that in practice, when a new base station is installed, errors can occur in the cabling so that not all the antennas are connected in the predetermined manner to the ports.

Referring to FIG. 2, a base station is newly installed in a mobile telephony network. The base station has the diversity pairs A11, A12, A21, A22 and A31, A32 which in this example are connected at random to the ports P1 to P6 of respective transceivers 4. That may be done in the sense that the installers either deliberately do not attempt to connect the diversity pairs to the ports according to a predetermined plan or try to connect according to a plan but make mistakes. The transceivers 4 have signal processors and other processing circuitry and produce, in accordance with conventional practice, signals RSSI which indicate the strengths of the signals received by the processors: RSSI means Received Signal Strength Indicator. Each transceiver in this example is independent of any other transceiver; for example none share a local oscillator. Each transceiver is independently tuneable.

The transceivers are connected to a modem 5 which modulates and demodulates data, provided to, and from, pairs of transceivers.

In an embodiment of the invention, the modem 5 is able to route data arbitrarily to each and any pair of transceivers and use these collectively to provide a MIMO radio function.

The RSSI signals are provided to a test processor 6 which determines the configuration of the base station; that is, the test processor 6 determines the order in which the antennas are connected to the signal processors 4. The processor 6 has a display 61 which may be located remotely, for example at a network control centre, and on which configuration errors may be indicated to the operator.

Figure 3A:
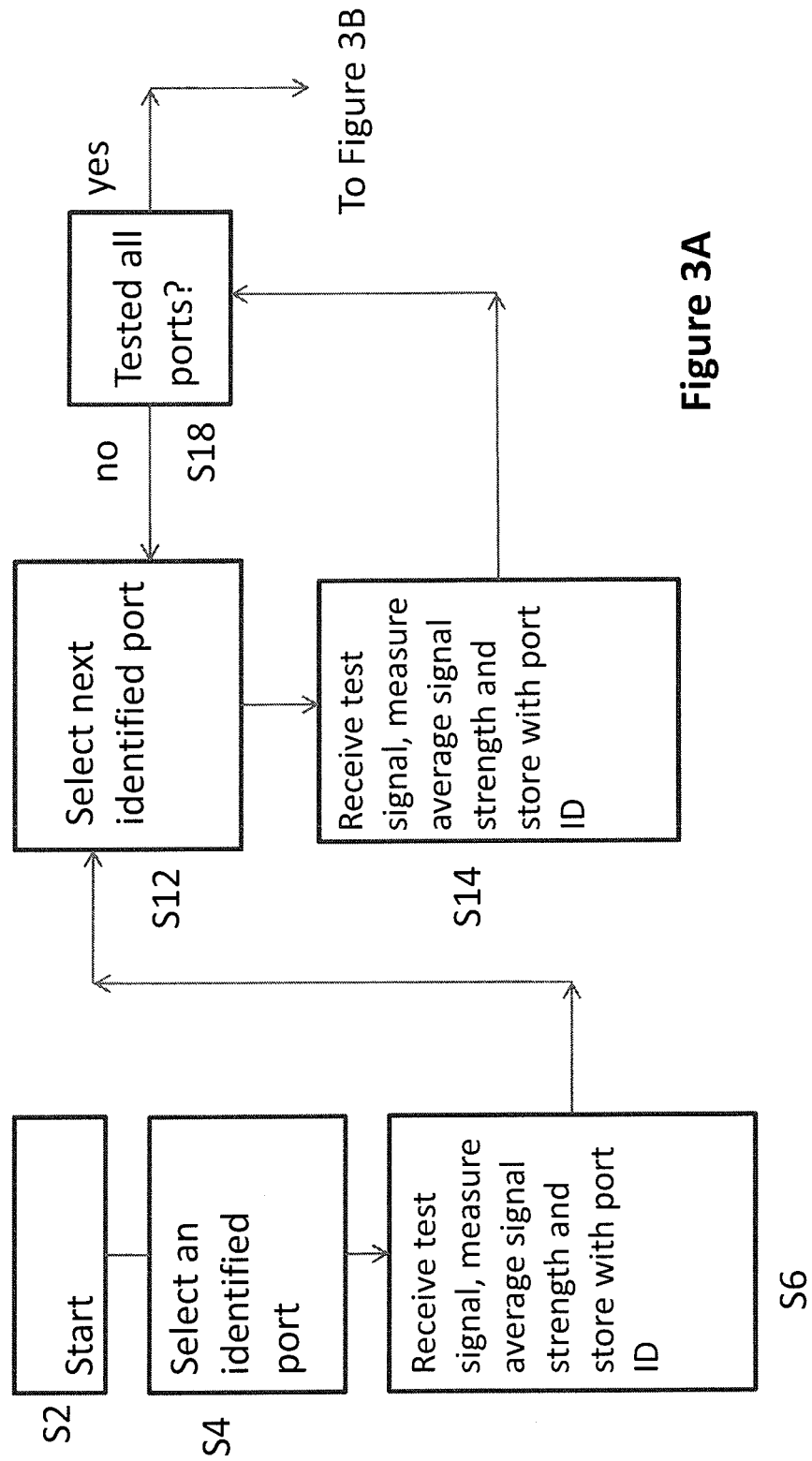
FIGS. 3A, 3B, and 3C are flow charts illustrating an example of a method, in accordance with the invention, of operation of the apparatus of FIG. 2.
Figure 3B:
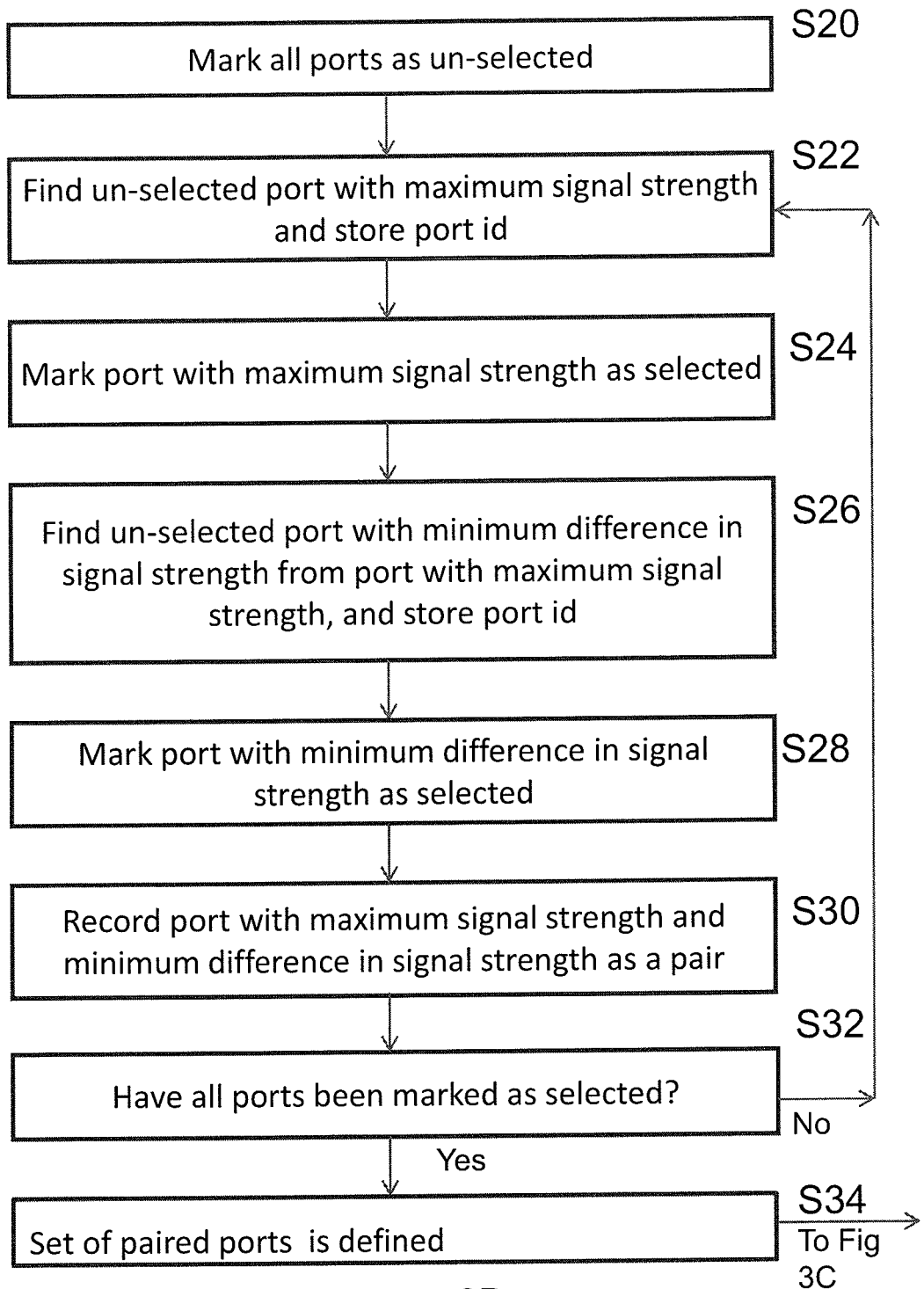
Figure 3C:
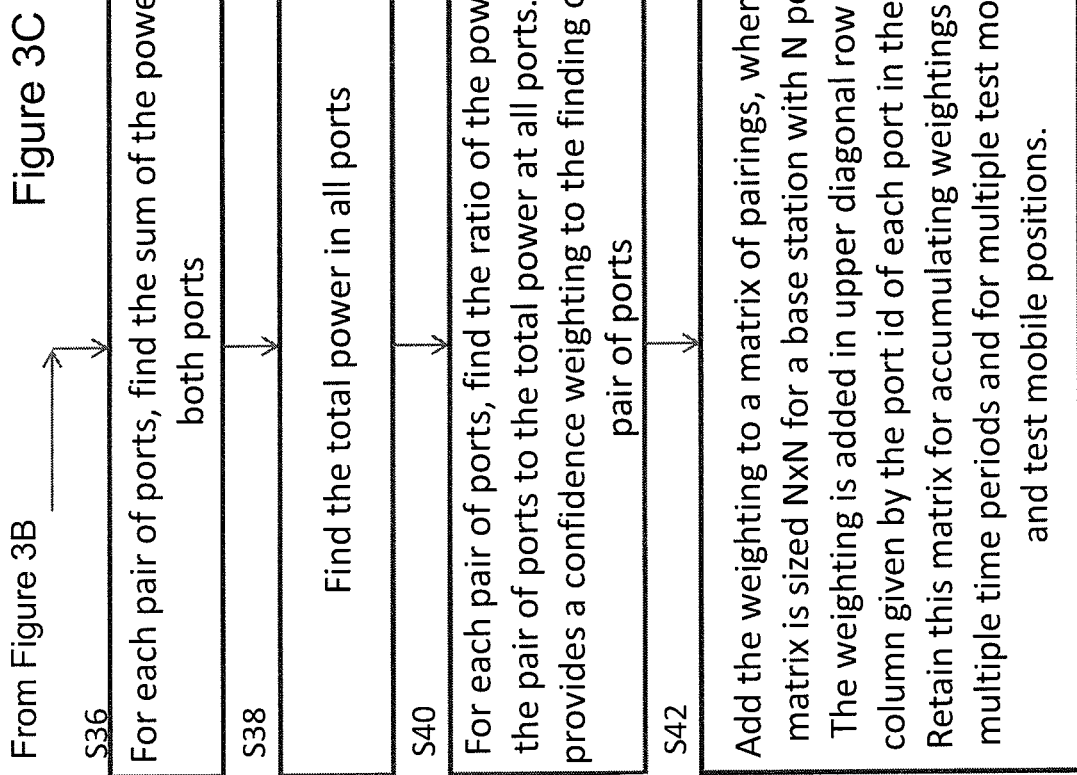

In this example, the test processor operates in accordance with the flow charts of FIGS. 3A, 3B and 3C. Referring to FIG. 3A, in step S2 the base station is activated to operate at a single frequency; i.e. all the transceivers operate at the same frequency as if in a single frequency network. All the transceivers 4 operate at least to receive a test signal from a test signal source such as source 2 in FIG. 2. In this example the test signal source is a test mobile but other signal sources may be used. The test signal source may be a user terminal, for example a mobile telephone, operating within the mobile telephony network. The test mobile may be operating solely for the purpose of configuring the base station, or may be a user mobile engaged in communication with another base station, and within range of the base station to be configured. The test mobile may be a user mobile engaged in communication with the base station to be configured, and with the base station operating S2 in a start-up mode in which only one sector is simultaneously operational, and in which only one antenna channel is active.

In step S4, any one of the ports P1 to P6 is selected and in step S6 the test signal is received and its average signal strength measured over a predetermined period of time. The average signal strength is stored with an identifier (ID) identifying the port. In steps S12 and S14, another port is selected and the test signal is received and its average signal strength measured over a predetermined period of time. The average signal strength is stored with an identifier (ID) identifying the another port. That process is repeated (S18) until all the ports have been tested thus measuring and recording the average signal strength at each of the transceivers. However, the connections of the ports P1 to P6 to the diversity pairs A11 to A32 are still unknown.

In the following description, ports are selected and, as shown in FIG. 2, the test signal source is not necessarily aligned with the main beam of an antenna connected to the selected port. Consequently, it is possible that signals from the test source are received via side lobes of the antennas of the base station. It is therefore not straightforward to determine which antennas are paired. Referring to FIG. 3B, all signal strengths are compared with all other signal strengths and pairs of antennas are identified based on a predetermined comparison criterion. Referring to FIG. 3C, the identification of the pairings may be additionally or optionally further refined by accumulating data over time from many test sources in many different locations.

Referring to FIG. 3B, in step S20, using the data of port IDs and signal strengths produced by the process of FIG. 3A, all ports are initially marked as unselected. In steps S22 and S24, the signals strengths of all the ports are compared one with the other to find the port with the maximum signal strength and that port is marked as selected as the selected maximum port. In steps S26 and S28 the signal strengths of the remaining ports are compared with that of the selected port to determine which has the minimum difference from the signal strength of the selected maximum port. Those two ports are designated as a pair in step S30. The process of steps S22 to S30 is repeated in steps S32 and S34 for all the remaining unselected ports until all pairs of ports have been identified.

The process of FIGS. 3A and 3B may be used as the sole test for identifying the pairs of antennas of the base station. However the process may be supplemented by the process of FIG. 3C which continues the process of FIGS. 3A and B over time and for many different locations of the test source 2. This process may involve the network management function indicating to the base station how many diversity pairs should be at the base station.

In step S36, for each pair of ports identified by the process of FIG. 3B, the sum of the signal strengths (or powers) associated with those two ports is calculated, and in Step S38 the sum of all signal strengths (or powers) associated with the ports is calculated. In step S40, for each pair of ports, the ratio of the sum of the power of the pair to the sum of all powers is calculated and designated as a confidence weight to the pairing of ports.

A matrix as shown by way of example in FIG. 4 is used, the matrix having a number of rows and of columns each equal to the number of ports. In the example corresponding to FIG. 2, there are six ports, so the matrix is 6×6. The intersection of a row and a column corresponds to a pair of ports. Weighting factors produced in steps S36 to S40 are stored in the matrix at the appropriate positions in the matrix. Thus for a pair of ports P1 and P2, a weighting factor W12 is stored in cell P1P2. Because a weight W21 for ports P2 and P1 will be the same it too is stored in cell P1P2 with the result that half the matrix as indicated by X is not needed. FIG. 4, shows other possible weights in representative cells.

The contents of the matrix are retained and over a period of time measurements of signal strength (or power), collected and processed by the process of FIGS. 3A and B, are processed by steps S36 to S40 and the weights accumulated with (i.e. summed with) the accumulated weights in the matrix.

In step S44, all rows and columns of the matrix are marked as unselected. The cell containing the maximum weighting is found in step S46 and the ID of the pair of ports, as identified by the row and column of the cell, is stored and the row and column are marked as selected. As indicated by steps 50 and 52. The process is repeated for the remaining rows and columns.

The use of the matrix provides confidence ratings by which the selection of pairs of antennas can be refined and changed if necessary.

Thus, in the example of FIGS. 3A to 3C, a weighting process is used in order to provide a measure of confidence in the selected pair of ports. The weight values can be accumulated over repeated measurements of the test mobile, for multiple test locations of one mobile and/or for multiple test mobiles.

In the case that there are more than two antennas per sector, the selection of the set of antennas may first begin with the identification of the highest weighted pair of ports. The process may then select an additional port for the set by selecting the highest weighted match between any unselected port and either of the two first selected ports.

Once the end of the process of FIGS. 3A and B (and optionally FIG. 3C) is reached, all that is known is which of the ports and transceivers are connected to the same diversity pair of antennas. For example, referring to FIG. 2, it will be known that ports P5 and P3 are connected to the same diversity pair of antennas but the sector of geographic coverage and actual pointing angles to which the diversity pair belong is not known. Methods of determining the pointing directions will be described below.

Figure 5:
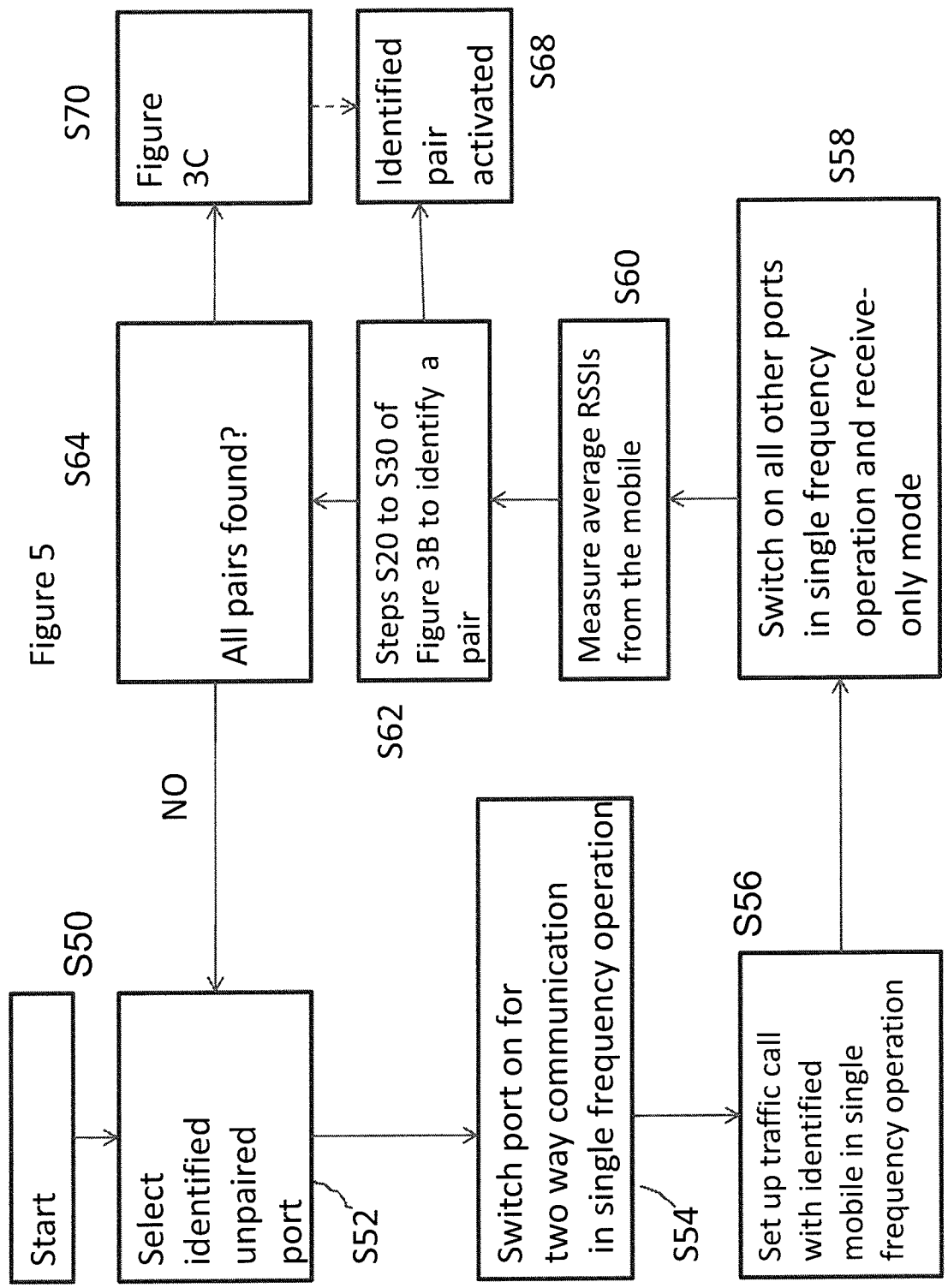
FIG. 5 is a flow chart illustrating another method of operation of the apparatus of FIG. 2.

Alternative Example (FIG. 5)

Consider the configuration described above with reference to FIGS. 1 and 2. There are three sectors each having a diversity pair of antennas. An alternative way of determining the configuration is as follows.

Select a port which in step S52 is an identified port which has not been paired with any other port. In step S54 switch on that port for two way communication with any mobile in the vicinity of the base station. In step S56, set up a two way traffic call with the mobile: doing that involves identifying the mobile. Where the base station supports MIMO transmit diversity, the communication is initially enabled with a single transmit channel only. In step S58 switch on all the other ports in receive only mode in the single frequency mode of operation. All the ports are operational to receive from the mobile whilst the originally selected port remains active in two way communication with the mobile. In step S60, the RSSI of the signal received from the identified mobile (and ignoring any signal received from any other mobiles which may be transmitting) at each port is measured and stored with the identity of the port. Then, in step S62, steps S20 to S30 of the process of FIG. 3B are carried out to identify a pair of ports having the highest RSSI and the least difference from the highest RSSI as described above with reference to FIG. 3B. The identified pair may be activated in step S68 to be fully operational. This may involve the enabling of full MIMO operation. The identified pair may or may not include the originally selected port which communicates two-way with the mobile.

If all pairs of ports have not been found (step S64), another unpaired port is selected and steps S52 to S62 repeated again in single frequency operation for all the unpaired ports possibly with a different identified mobile.

The step S64 may involve the network management function indicating to the base station how many diversity pairs should be at the base station.

Steps S54 and S58 have been shown as separate, sequential, steps for ease of description but may be carried out at the same time.

The process of FIG. 3C may be carried out once all the pairs have been identified as indicated in step S70 or the process of identifying pairs may include the process of FIG. 3C as indicated by the dotted arrow.

Once the pairs have been identified in single frequency operation, frequencies may be allocated to the pairs according to the frequency re-use scheme of the network as described below with reference to FIGS. 6 and 7. Also the directions in which the sectors point may be determined as described below.

Determining Pointing Directions

An example of a method of determining the pointing angles of the diversity pairs to which the ports and transceivers are connected is described as follows. It may be assumed that test mobiles exist for which the geographical location is known. The test mobile may be a user terminal in which a system is installed for determining geographic location in which case the test mobile can transmit its position to the base station. Alternatively the test mobile location may be determined by triangulation of propagation delays to multiple base stations.

The test mobile may also be a purposely provided test signal for which the location is known. A list of bearings of the location(s) of the test mobile is recorded, supported by each antenna at the base station, and the geographic antenna pointing angle is approximated as the centre of the angular range. In one example method, the set of bearings to test mobiles served by the sector is grouped into a histogram, and this distribution is then be limited to the range incorporating a defined proportion of test mobiles. This eliminates outlying bearings from the set of bearings. The mid range between the positive and negative extremes of the selected interval is then recorded as the antenna pointing angle.

Referring to FIG. 6 yet another example of a process for determining beam direction is shown. A network comprises many cells 12. Frequencies are allocated to the cells in the example of FIG. 6 according to a frequency re-use scheme having three frequencies, F1, F2 and F3. The frequencies are allocated to the cells so that adjacent cells operate at different frequencies. In FIG. 6, the cells are further grouped in groups of three. Each group of three is served by one base station positioned at the intersection of the three cells. Each cell corresponds to one sector served by the base station. In FIG. 6 two base stations 8 and 10 are shown. Base station 8 is the base station of FIG. 2. Base station 10 is an adjacent station. There are others, not shown in FIG. 6. Base station 8 serves three cells A, B and C.

Assume that the process of FIGS. 3A and 3B (or of FIG. 5) has been successfully completed so that, for each diversity pair of antennas, it is known which of the ports and signal processors are connected to the same diversity pair of antennas but the identity of the pair of antennas and the sector to which the diversity pair belong is not known.

Associating Sectors with Frequencies

Figure 7A:
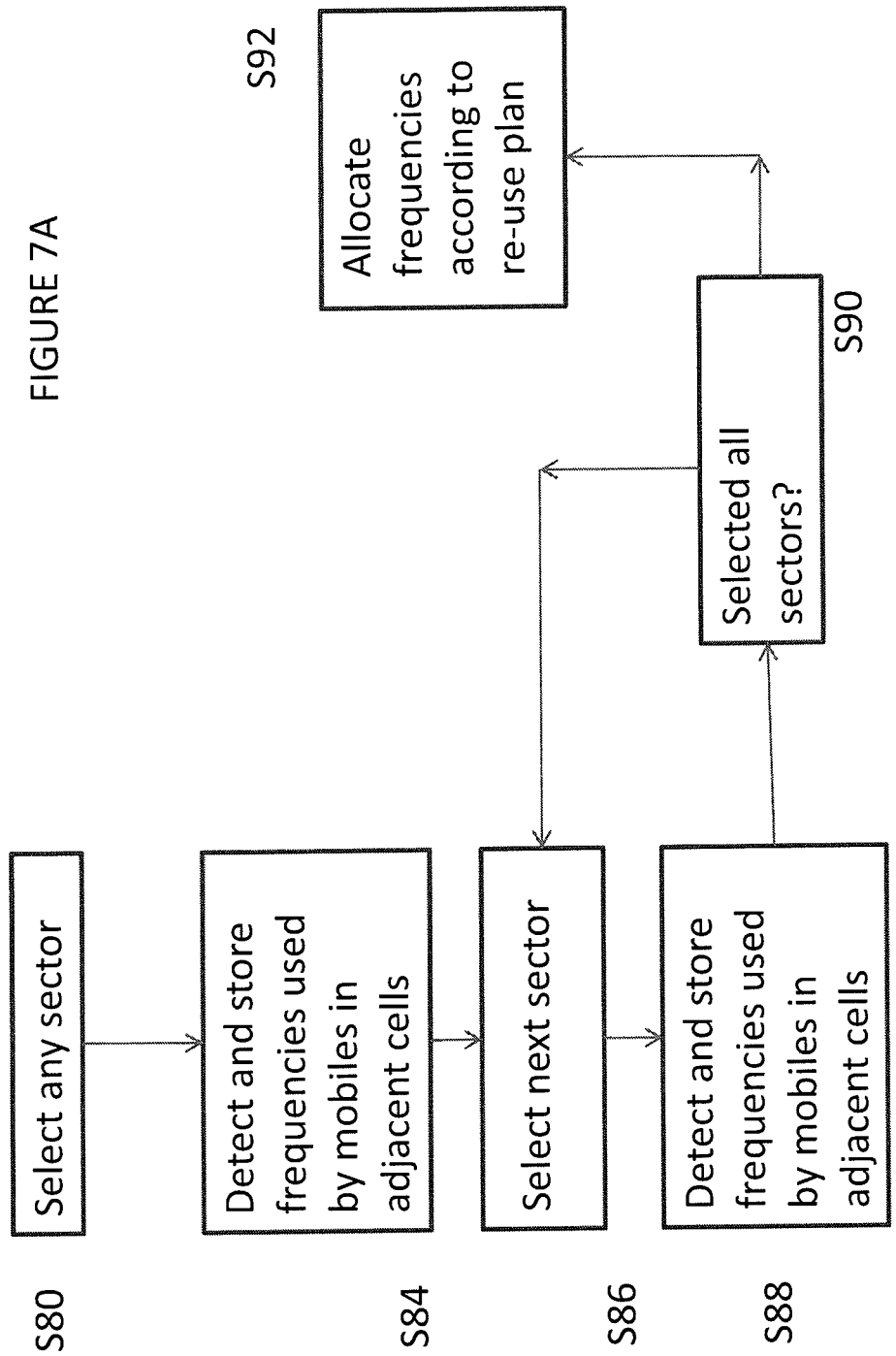
FIGS. 7A and 7B are flow charts illustrating an example of a method, in accordance with the invention, of setting the frequencies of sectors around a base station.

An example of a method of associating the pairs of ports of the base station 8 with sectors (i.e. cells) of the network will now be described referring to the flow charts of FIGS. 7A and 7B.

Initially, all the transceivers of the base station 8 operate at the same single frequency. In step S80, any diversity pair and its associated pair of transceivers is selected thus selecting a sector although it is not known which sector is selected. The signals from mobiles in adjacent sectors are received and monitored by the transceivers 4 of that sector and the test processor 6. When a user terminal moves from one sector to another it remains on the same frequency that is initially used in all sectors at the base station 8. When a user terminal moves to or from a sector of base station 8 to or from a sector of adjacent base station 10, may change its frequency of operation. The frequency used by the sector in adjacent base station 10 is referred to herein as the handover frequency. The handover frequencies of mobiles in adjacent cells are detected and stored with a sector ID in step S84. Another sector is selected S86 and the handover frequencies of mobiles in adjacent sectors are detected and stored for that selected sector. That is repeated for all sectors S90. Once all the sectors have been selected the result is a distribution of handover frequencies ordered by the sectors of the base station 8.

Figure 7B:
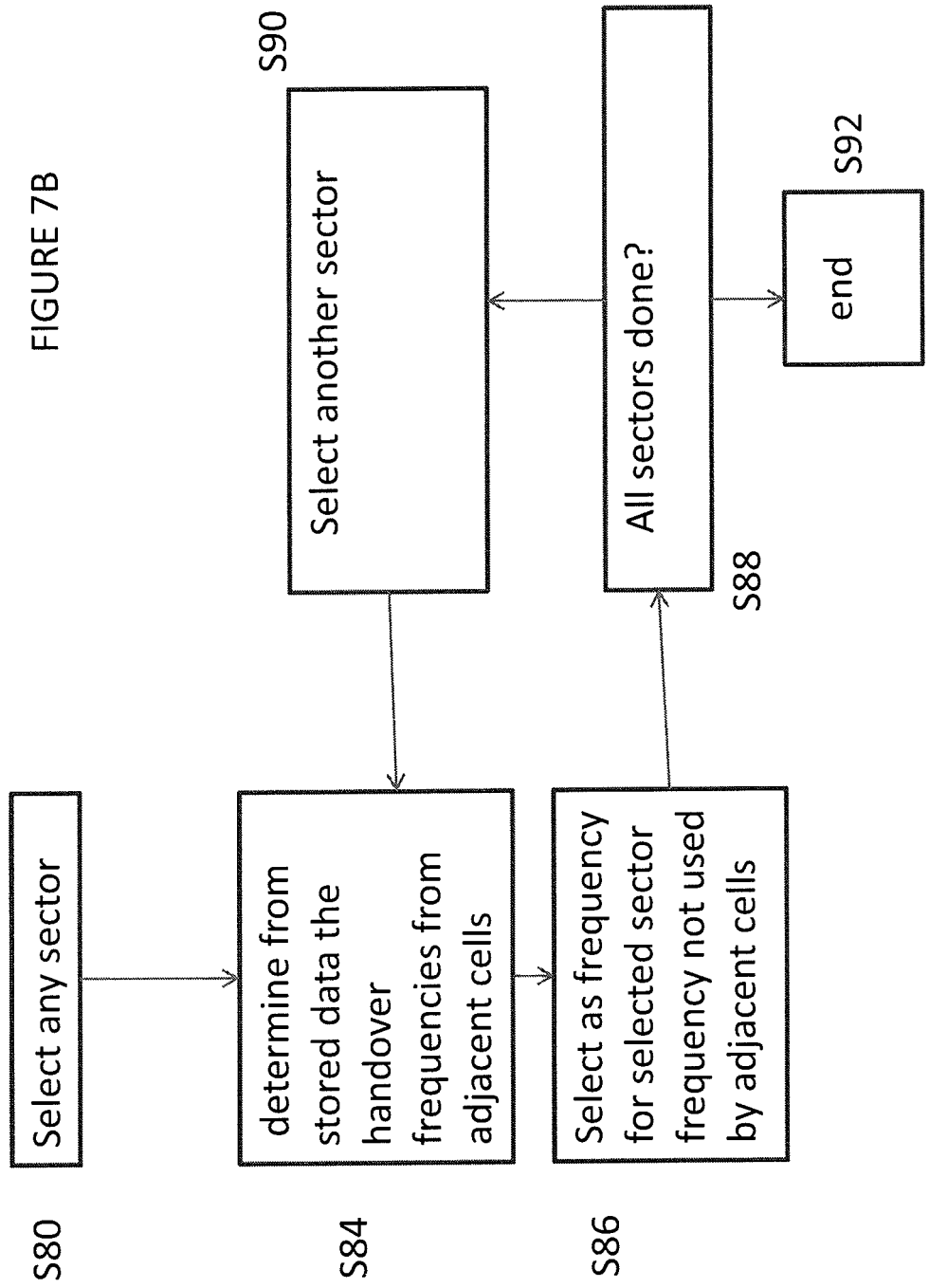

The process of FIG. 7B allocates frequencies to the sectors according to the reuse scheme of the network. The process starts at step S80 which selects any one of the sectors. It determines from the distribution of the handover frequencies associated with that sector, a frequency different to the handover frequencies of the adjacent sectors on the basis that the frequency to be allocated to the sector must be different to the frequencies of the adjacent sectors because that is dictated by the re-use scheme. For example, all possible frequency assignments at base station 8 may be examined to find the combination in which the assigned frequencies would result in the minimum number of handovers on the same frequency. This ensures that no two sectors at base station 8 operate on the same frequency. That process is repeated for all sectors in steps S88 and S90 until frequencies are allocated to all sectors (S92). The test processor may control the frequencies of the local oscillators of the transceivers of the signal processors 6.

Once the connection of the antennas to the signal processors is known, in one example the test processor 6 displays on the display 61 a map of the connections. This display may represent a software management function at the network control centre, at which either a human operator or a software control function may manage the cellular network. The operators may in one example use the map to make any changes they require to the connections. For example they may regard the connections as incorrect and so they reconnect the antennas to the signal processors. In another example, the signal processors 4 are individually tuneable. Thus as will be explained with reference to FIGS. 6 and 7, the frequencies of the signal processors 4 may be set Detecting Faults The information available at the end of the process of FIGS. 3A and 3B includes average signal strengths received by the signal processors and comparisons of those signal strengths. That information may be used for purposes other than and/or additional to determining which signal processors are connected to a diversity pair. That information may be used to detect faults for example. For example if a port cannot be paired with any other port because the average signal strength associated with it does not match any other signal strength within predefined limits, there may be a fault. The fault could be a connection failure: for example a cable might be wrongly connected. The test processor 6 may be arranged to display an alarm condition on the display 61, identifying the port associated with the alarm condition.

As will be described hereinbelow in more detail, some base stations may have other arrangements of antennas and comparisons of average signal strength may be used to: determine which antennas are adjacent: detect faults for example beam pointing errors; detect differences in radiation patterns; and detect faults in RF components. These RF components may include beam-forming networks, such as Butler matrix combiners, used to generate multiple radiation pattern beams from an antenna of radiating antenna elements.

Consider FIG. 8 which schematically shows a base station having three sectors each including one diversity pair. The boundaries of the sectors are indicated by the arrowed lines Cp. Each diversity pair produces a radiation pattern or beam 14 which overlaps its two neighbouring patterns 14a and 14b. The patterns intersect at cusps which lie on the boundaries Cp between the sectors. The base station of FIG. 8 operates on space division multiplexing (SDMA). A pair of beams 14 may be deemed to be adjacent if it is found that user mobiles are required to hand over from one sector to the adjacent sector. Alternatively, to generate a test signal at a cusp, an operator may physically align a test user terminal with the boundary between two sectors. Alternatively, a test signal may be detected to be at a cusp if it is received with equal average signal strength at the four signal processors connected to two adjacent diversity pairs of antennas.

Using test signals at cusps, a distribution can be formed to show the variation in average signal strength received by the four signal processors of the diversity pairs of adjacent sectors. That distribution can be used to detect differences in radiation patterns of the antennas and potential faults in beam formers. Having determined that a pair of signal processors is connected to a diversity pair of antennas, comparison of the average signal strengths received by the two signal processors at a cusp may be used to detect potential beam pointing errors of the antennas of the diversity pair. If the antennas are misaligned (i.e. there is a beam pointing error), the average signal strengths will be different.

A similar technique may also be used to detect differences in the received signal between the multiple antennas covering the same sector. If the average signal strength of one channel is lower than the average signal strength of another, this may indicate a fault in the RF connections, a reduced amplifier gain, or a fault with the antenna. If one port receives a higher signal than the associated pair when handing over to one sector, and if the signal strength difference is reversed when handing over to another sector, this is likely to indicate a difference in pointing direction. In the case that the antenna is a single unit with dual polarisation, the physical pointing directions are equal. Differences in the relative signal strengths at the handover cusps may therefore indicate a fault within the antenna such that the intended radiation pattern is not formed in practice.

Average Signal Strength

The term "average signal strength" is used hereinabove and is also referred to as "power". The signal strength is averaged over a period of time chosen by the network operator. The antennas of a diversity pair have different polarisations but a signal from a test source will have a polarisation varying with time due to multiple reflections and multiple different signal paths. By averaging the signal strength from one source over an adequate time period the antennas of a diversity pair will receive equal signal strengths. The average signal strengths are compared and are deemed equal if they are equal within a predefined tolerance.

In order to provide test measurements such that antenna pairs can be identified for each of the sectors, multiple test mobile positions may be required as discussed with reference to FIG. 3C.

Other Embodiments

The above embodiments are to be understood as illustrative examples of the invention. Further embodiments of the invention are envisaged.

a Pair of Transceivers Share a Local Oscillator

Figure 9:
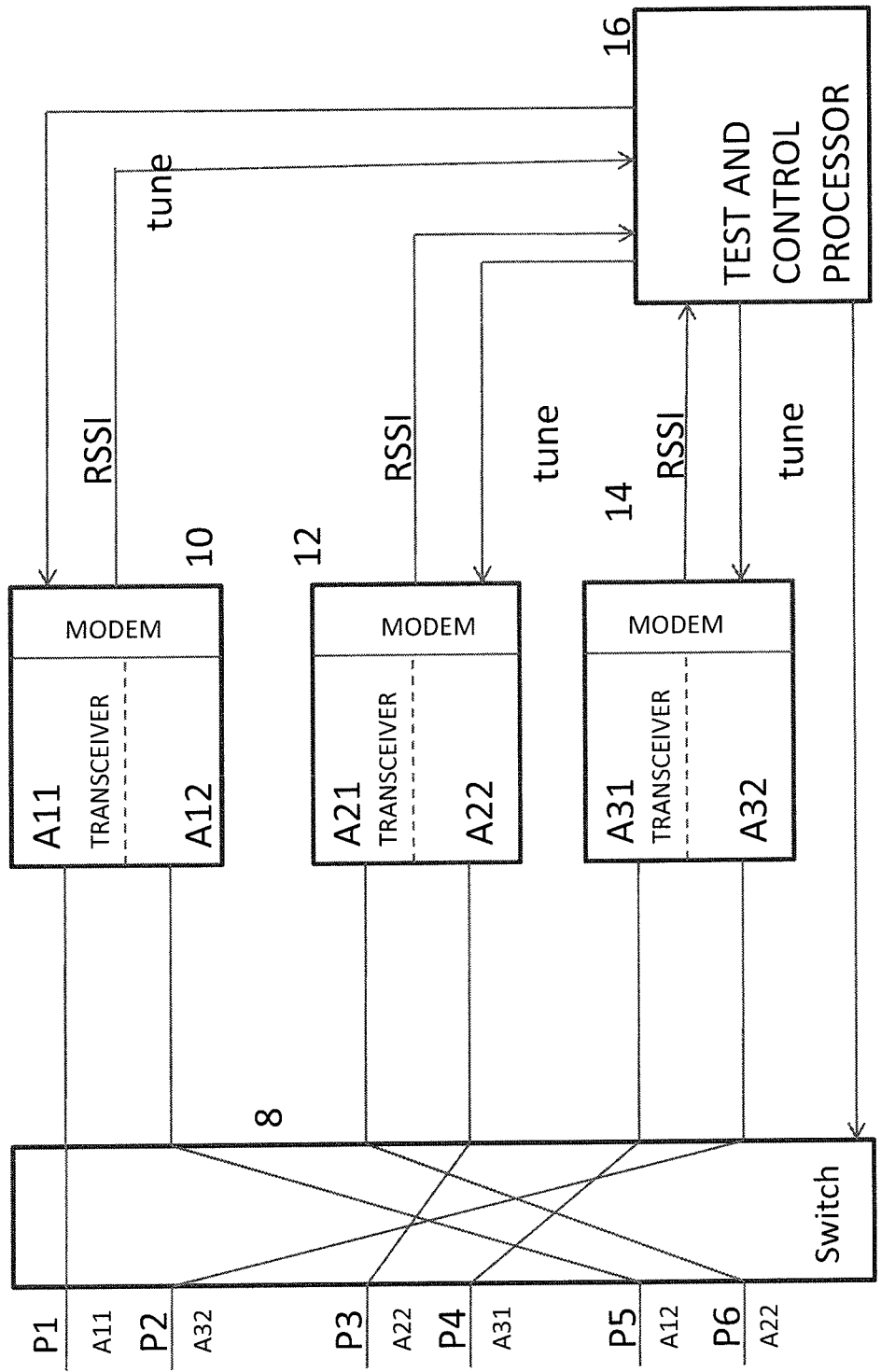
FIG. 9 is a schematic block diagram of another example of apparatus in accordance with the invention in which pairs of transceivers share a local oscillator.

Referring now to FIG. 9, the base station of FIG. 9 has transceivers arranged in pairs 10, 12, 14 to be associated with respective ones of the diversity pairs of antennas. Each pair of transceivers 10, 12 14 share the same local oscillator and thus the transceivers of the pair must be connected to the same diversity pair of antennas. The pairs are individually tuneable under the control of a control processor 16.

A switch 8 is operable to connect any one of the ports P1 to P6 to any one of the inputs I11 to I32 of the transceivers. The switch 8 would need to be a switch which does not introduce significant noise, distortion or attenuation into the received signals. Assume that the antennas are connected to the ports P1 to P6 in the same random pattern as shown in FIG. 2. In the example of FIG. 9 however, a diversity pair of antennas e.g. A11, A12 must be connected to an associated pair of transceivers 10 as indicated in FIG. 9 by way of example as A11 and A12. Although FIG. 9 shows the pairs of signal processors 10, 12 and 14 connected to diversity pairs A1, A2 and A3, they may be connected in other orders because the pairs are tuneable under the control of processor 16.

The frequencies of operation of the transceivers are controlled by the control processor 6. The pairings of the ports to the pairs of transceivers may be done using the process of FIG. 3, in which initially all the transceivers operate at the same frequency. Assume the switch connects the ports to the transceivers in randomly. The process of FIG. 3 will identify the pairs of antennas and the respective transceivers to which they are connected. That information is used to establish the configuration of the switch which can then be reconfigured to correctly connect the antennas to the paired transceivers.

In another embodiment, where the transceivers are not independently tuneable for example in pairs sharing a common local oscillator (as in FIG. 9) but where the hardware is as shown in FIG. 2 (i.e. without the RF switch 8 between the antennas and the transceivers), the algorithm of FIG. 3 as described above may be employed with the base station initially operating on a single frequency, to determine the pairs of antenna based on the cable connections. In the event that the pairs are found to be connected such that the two channels of a transceiver are required to operate with different frequencies, an alarm is generated and forwarded to the network control centre. The base station may continue to operate with a single antenna port per sector on those sectors for which the cables are incorrectly connected.

Figure 10:
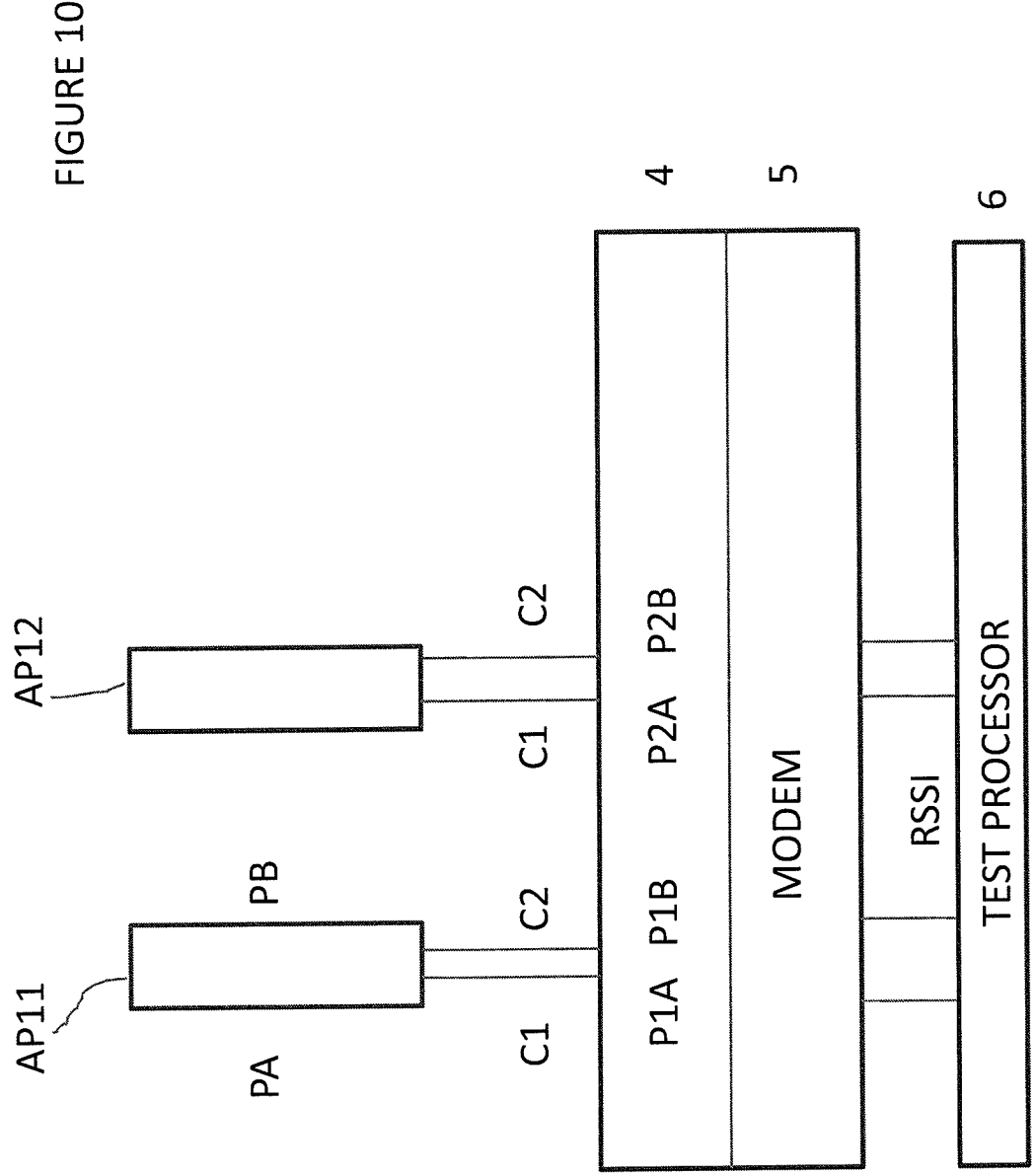
FIG. 10 is a schematic block diagram of one sector of yet another example of apparatus in accordance with the invention.
Figure 11:
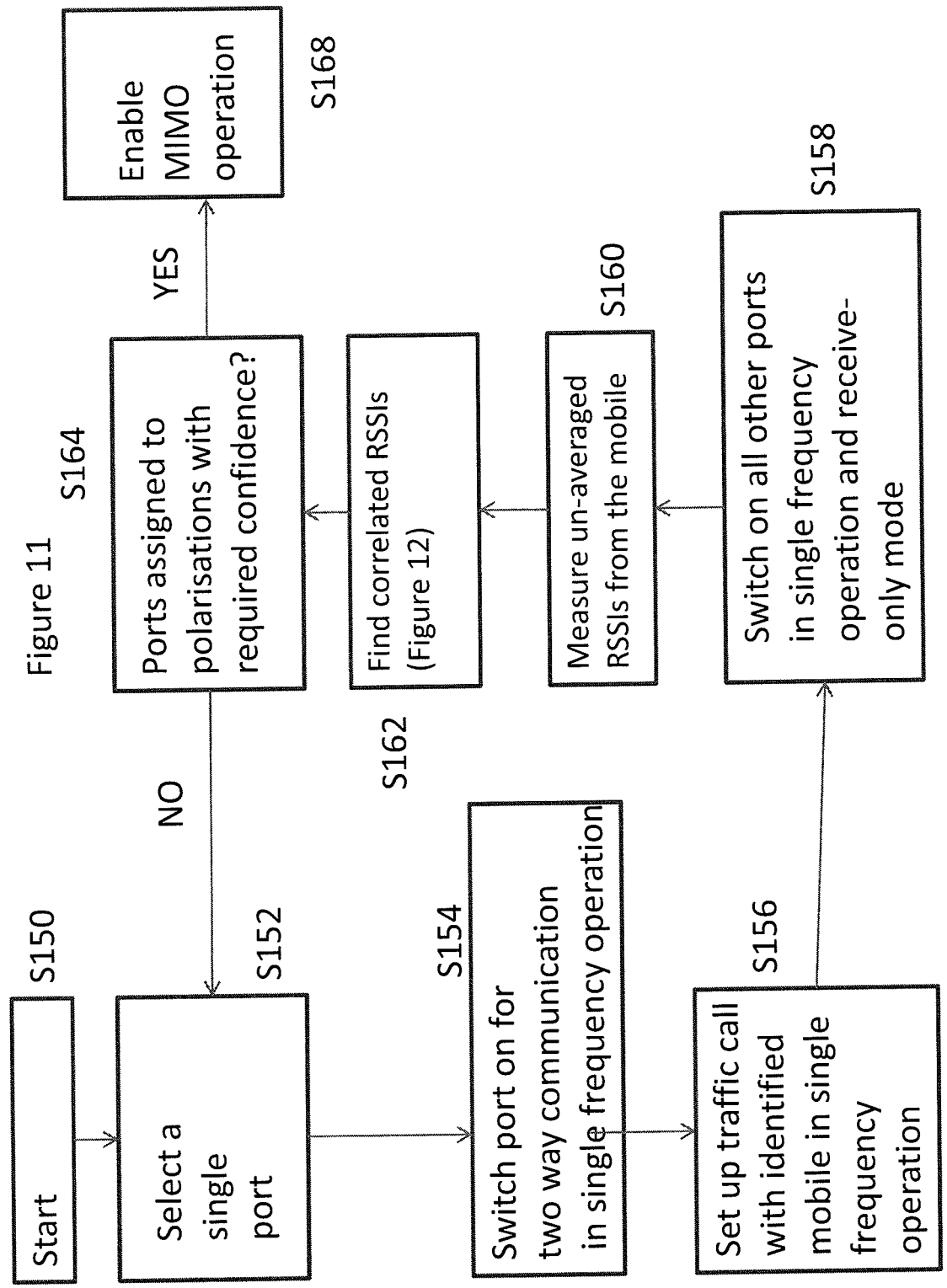
FIGS. 11 and 12 are flow charts illustrating a method of operation of the apparatus of FIG. 10 in which antenna channels of the same polarisation are identified.
Figure 12:
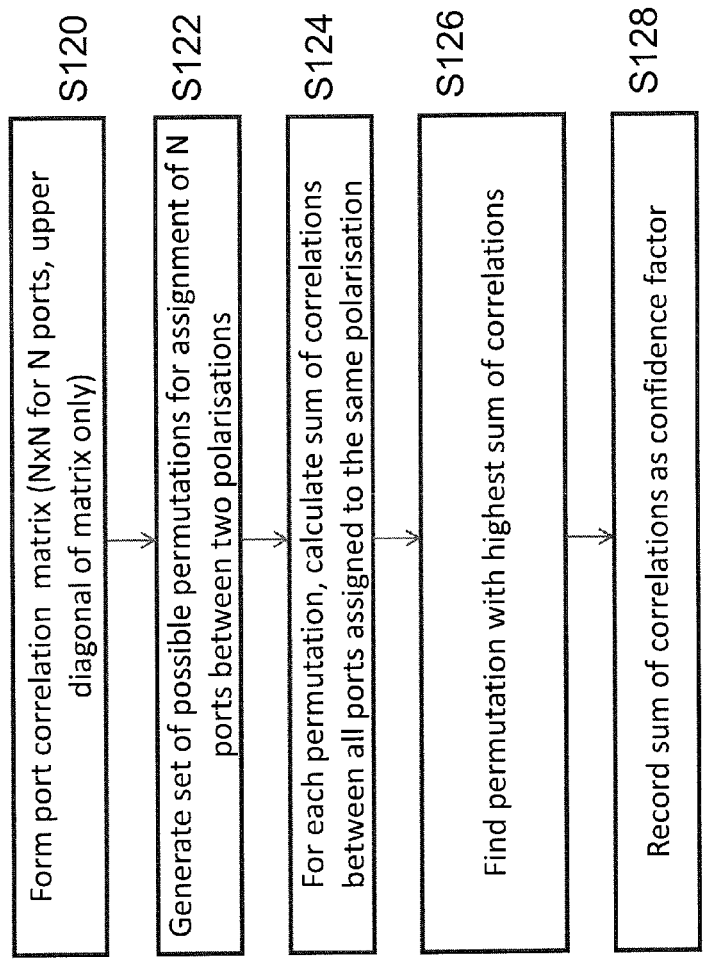

Identifying Antennas of the Same Polarisation (FIGS. 10, 11 and 12)

Referring to FIG. 10, there is shown one sector of a base station which may have at least one other sector. The sector shown operates as a MIMO sector. It has two pairs of antennas AP11 and AP12 which are spaced apart. Each antenna pair has two antennas of orthogonal polarisations PA and PB for example vertical and horizontal or + and −45 degrees. The four antennas are connected by four cables C to four ports P1A, P1B, P2A and P2B respectively. The ports are ports of transceivers 4 which are coupled to a modem 5 as shown in for example FIG. 2. The modem outputs signals RSSI indicating the signal strengths received at the respective ports. A test processor 6 receives the RSSIs and processes them.

The pairings of the ports to the antenna pairs and the pointing directions of the antennas may be determined by measuring the average RSSIs and processing them as discussed above with reference to FIG. 3 for example.

MIMO operation takes advantage of the spatial separation of the antennas and the different polarisations in order to provide multiple diverse propagation channels. In this case, it is sufficient to identify which antennas cover the same sector but it is not necessary to distinguish which antennas are spatially separated or using different polarisations. However, for spatial multiplexing, adaptive beamforming or other techniques in which a directive beam pattern is formed, a set of digital weights may be applied to the multiple antenna channels per sector. In this case, it is assumed that the antenna ports corresponding to a common polarisation connect to a closely spaced array of elements, such as multiple side-by-side columns, it is necessary to identify all the antennas in the sector which have the same polarisation, if that is not already known. To do that instead of measuring average RSSIs from a test source, this embodiment of the invention measures the variation in RSSI at each of the ports and determines_which antennas have the same polarisation by determining which of the signals are correlated, Referring to FIG. 11, in only one sector as shown in FIG. 10, step S152 selects a port which is an identified port which has not been associated with any other port for the purpose of determining polarisation. In step S154 that port is switched on for two way communication with any mobile in the vicinity of the base station. In step S156, a two way traffic call is set up with the mobile: doing that involves identifying the mobile. In step S158 all the other ports in the one sector are switched on in receive only mode in the single frequency mode of operation. All the ports are operational to receive from the mobile whilst the originally selected port remains active in two way communication with the mobile. In step S160, the un-averaged RSSI of the signal received from the identified mobile (and ignoring any signal received from any other mobiles which may be transmitting) at each port is measured over a period of time (referred to as a window) and stored with the identity of the port. The un-averaged RSSI will vary over that period in normal operation. Then, in step S162, the process of FIG. 12 is carried out to identify a set of ports having the highest correlated variations in RSSI over the window. The identified set may be activated in step S168 to be fully operational.

If the polarisations of ports have not been found (step S164) with the required confidence factor, a further port is selected and steps S152 to S162 repeated again in single frequency operation, possibly with a different identified mobile.

Steps S154 and S158 have been shown as separate, sequential, steps for ease of description but may be carried out at the same time.

Referring to FIG. 12, in step S120, using the data of port IDs and variation in signal strengths produced by the process of FIG. 11, all ports of the one sector are initially marked as unselected. In this process, it is assumed that the ports have already been assigned to a sector, and that the process is applied within a sector that corresponds to the test mobile location (i.e. the test mobile has the strongest average RSSI in the sector to which the algorithm is applied). In steps S122 and S124, it is assumed that there are N ports assigned to the sector, and that there are N/2 ports connected to each of two polarisations. In step S120, a correlation matrix is formed between the N ports, resulting in an N×N upper diagonal matrix (leading diagonal excluded). In step S122, the algorithm generates all possible permutations of the assignment of N ports to the two polarisations. In step S124, the correlations between all pairings within both sets of N/2 ports are summed. In step S126, the permutation with the highest sum of these correlations is identified, and this permutation is then recommended as the assignment of ports to polarisations. The sum of the correlations is used as a confidence factor in determining the reliability of the port assignment.

The above description assumes that correlated variations in signal strength will be used to indicate ports of the same polarisation. However, the modulus of a complex correlation function may also be used, where complex signal samples are compared.

Having assigned the ports to the two polarisations as above, it is then possible to extend the process to determine adjacent pairs of ports on a common polarisation. The correlation can be expected to be highest between ports connected to adjacent pairs of antenna elements, and to be decrease as the physical separation between the antenna elements increases.

Beam Pointing Directions

The identity of mobiles may be known to the base station and the approximate location of a mobile in a cell can be determined by triangulation using the known co-ordinates of the base station and an adjacent base station, and timing advance parameters which indicate the approximate distance of the mobile from the adjacent base stations. By tracking identified mobiles, information can be generated to determine the range of azimuth angles served by each beam pair at the base station to determine the compass bearings of the beam pairs and the sequence of the beam pairs around the base station.

Beams and Antennas

"Antenna' refers to a physical antenna, conventionally with one polarisation or two orthogonal polarisations, and either one or two RF connector ports. The antenna may also be a single housing in which several radiating structure are co-located. The antenna may also be an array of radiating elements connected to a beam-forming combiner circuit in which one single radiating aperture generates multiple radiated beams. The beams may also be generated using either digital or RF phase and amplitude weights applied to the signals at each transceiver port by the radio equipment or modems. In this case, the signals received from a sector antenna are selected by the assignment of the appropriate phase and amplitude weights, rather than by the selection of a physical RF connector. As discussed above an antenna may comprise an array of radiating antenna elements. An antenna may include beam-forming networks, such as Butler matrix combiners, used to generate multiple radiation pattern beams from a single antenna comprising such beam formers Base Station and Sectors A base station may have more than three sectors. The sectors may have unequal angles in azimuth.

The sectors may each have a MIMO-multiple in multiple out arrangement for example as described above but other arrangements are possible. A single omni-directional transmitter may be provided with multiple directional receivers covering different sectors-known as MISO (multiple in, single out). Yet other arrangements are known and may be used in the present invention.

There may be more than two pairs of antenna channels per sector. Also multiple channels could be provided to allow multiple carrier frequencies to be provided in the same sector, each with independent antennas. The purpose of this is not diversity, but is to provide signal combining 'in the air' as opposed to using an RF combiner.

Test Signal Source

The test signal source may be a test mobile, a test user terminal, another neighbouring base station, a user's mobile telephone or other user terminal.

User Terminal

A user terminal may be a mobile telephone, or other electronic communications device operable in the network.

Test Processor and Computer Program

The test processor of FIG. 2 or 4 has been described as a processor 6 distinct from other equipment of the base station. That processor may be a suitable programmable processor containing software for carrying out the invention. A base station may comprise a suitable processor as part of its conventional equipment. Such a processor may be programmed to carry out the methods described hereinabove in accordance with the invention.

The invention also provides a computer program which when run on a suitable processor is operable to carry out the method of the invention. The computer program may be carried on a carrier for example a signal or stored on any suitable computer readable medium, including a hard disk, an optical disk, magneto-optical disk, tape, electronic memory device for example a flash memory or any other suitable memory. The computer program may be stored on a server of a computer network and downloaded to the base station via, for example, the backhaul network.

It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the invention, which is defined in the accompanying claims.

The invention claimed is:

1. A method of testing a base station for use in a mobile telephony network, the base station including an antenna arrangement having a connection to a transceiver arrangement for producing a plurality of beams, the method comprising: detecting at the transceiver arrangement the signal strengths of a test signal received via the beams; comparing and/or correlating the said signal strengths detected at the transceiver arrangement; wherein the comparing and/or correlating the said signal strengths comprises comparing the signal strengths associated with each beam with all the other signal strengths associated with the other beams, and identifying adjacent beams by applying a predetermined criterion to the comparisons and applying confidence weights to the identifications of pairs of adjacent beams, the confidence weight for a pair of beams being the ratio of the signal strengths of the test signals received via the beams of the pair to the sum of the signal strengths of all test signals received by all the beams and using the results of the comparisons and/or correlations to detect the configuration of the connection between the antenna arrangement and transceiver arrangement.

2. A method according to claim 1, wherein the said criterion is, for a pair of beams not previously identified as adjacent, one has a greater signal strength than all other beams not previously identified as adjacent and the other differs therefrom by the smallest amount compared to all other beams not previously identified as adjacent.

3. A method according to claim 1, comprising repeatedly performing comparisons of signal strength over a period of time and for multiple different locations of the test signals, and accumulating confidence weights in association with the identified beams, the accumulated confidence weights indicating the degrees of confidence of the identification of adjacent beams.

4. A method according to claim 3, comprising using the accumulated weights to identify radio frequency component faults.

5. A method according to claim 1, wherein average signal strengths are compared.

6. A method according to claim 1, wherein said signal strengths are correlated to determine the configuration of the base station.

7. A method according to claim 1, wherein using the results of the comparisons and/or correlations to detect the configuration of the connection between the antenna arrangement and transceiver arrangement comprises using the results of the comparisons and/or correlations to detect an arrangement of components forming the connection between the antenna arrangement and transceiver arrangement.

8. A method according to claim 1, comprising:
comparing the signal strengths associated with each beam with all the other signal strengths associated with the other beams;
identifying adjacent beams based on the comparisons;
repeating the comparing the signal strengths over a period of time and for multiple different locations of test signals; and
accumulating confidence weights in association with the identified beams, wherein the accumulated confidence weights indicate the degrees of confidence of the identification of adjacent beams.

9. A method of determining the configuration of a base station for use in a mobile telephony network, the base station having multiple antennas connected by cables to transceivers, the antennas producing sets of associated beams, the method comprising: detecting at the transceivers the signal strengths of one or more test signals received via the antennas; for each transceiver, comparing the signal strength of the test signal received thereby with the signal strengths received by all the other transceivers; and comparing the signal strengths associated with each beam with all the other signal strengths associated with the other beams, and identifying adjacent beams by applying a predetermined criterion to the comparisons and further applying confidence weights to the identifications of pairs of adjacent beams, the confidence weight for a pair of beams being the ratio of the signal strengths of the test signals received via the beams of the pair to the sum of the signal strengths of all test signals received by all the beams and identifying from the comparisons which antennas are connected by the cables to which transceivers.

10. A method according to claim 9, wherein the step of detecting takes place at the same frequency of operation of all the transceivers.

11. A method according to claim 10, wherein the transceivers are independently tuneable, and comprising the step of retuning the transceivers after identifying the connections.

12. A method according to claim 9, wherein each pair of transceivers share a local oscillator and comprising deactivating one of the transceivers of a pair if that transceiver is, due to a cabling error, not connected to an antenna associated with the same set of beams as the other transceiver.

13. A method according to claim 9, wherein the sets of associated beams are associated with respective sectors and further comprising identifying the bearings of the sectors.

14. A method according to claim 13, further comprising receiving a test signal in a respective sector from a test signal source of known bearing, thereby identifying the bearing of the respective sector.

15. A method according to claim 14, wherein the test signal source transmits data identifying its location to the base station.

16. A method according to claim 9, wherein the sets of beams are associated with respective sectors and the base station is in a mobile telephony network having other base stations and a predetermined frequency re-use scheme, the method further comprising allocating frequencies to the sectors according to the re-use scheme once the connections of transceivers to the antennas have been identified.

17. A method according to claim 9, wherein the sets of beams are associated with respective sectors and the base station is in a mobile telephony network having other base stations and a predetermined frequency re-use scheme, the method further comprising detecting the handover frequencies of user terminals entering the sectors of the base station from adjacent sectors of one or more adjacent base stations, and allocating to the sectors of the base station frequencies complementary to the detected handover frequencies according to the frequency re-use scheme.

18. A method according to claim 9, wherein the said criterion is, for a pair of beams not previously identified as adjacent, one has a greater signal strength than all other beams not previously identified as adjacent and the other differs therefrom by the smallest amount compared to all other beams not previously identified as adjacent.

19. A method according to claim 9, comprising repeatedly performing the comparisons of signal strength over a period of time and for multiple different locations of the test signals, and accumulating the weights in association with the identified beams, the accumulated weights indicating the degrees of confidence of the identification of adjacent beams.

20. A method according to claim 9, comprising using the accumulated weights to identify faults.

21. A method of testing a base station for use in a mobile telephony network, the base station having more than three sectors, each sector including an antenna arrangement coupled to a transceiver arrangement, to produce a plurality of beams having respective azimuthal radiation patterns, adjacent beams having patterns which coincide at cusps, method comprising:
receiving a test signal at the transceiver arrangement;
determining that the test signal is from a test signal source which is located at the cusp of the azimuthal radiation patterns of adjacent sectors, wherein the determining comprises detecting that the test signal is received at the transceiver arrangement with equal average signal strengths at adjacent diversity pairs of antennas;
detecting average signal strengths of the test signal at the transceiver arrangement;
comparing the average signal strengths; and
detecting one or more fault conditions based on determining that the test signal is from a test signal source which is located at the cusp and comparing the average signal strengths.

22. A method according to claim 21, comprising finding average signal strengths which are equal and designating the corresponding beams as adjacent beams.

23. A method according to claim 22, wherein a said sector comprises a diversity pair of beams, and comprising detecting the average signal strengths received by the beams of the diversity pair from a test signal source which is located at the cusps of the azimuthal radiation patterns of adjacent sectors, comparing the said received average signal strengths, and indicating a fault if the received average signal strengths differ substantially.

24. A test apparatus for use in a base station of a mobile telephony network, the base station comprising a transceiver arrangement having a connection to an antenna arrangement for producing a plurality of beams, the test apparatus being configured to: detect at the transceiver arrangement the signal strengths of a test signal received via the beams; compare and/or correlate the said signal strengths detected at the transceiver arrangement; wherein to compare and/or correlate the said signal strengths comprises comparing the signal strengths associated with each beam with all the other signal strengths associated with the other beams, and identifying adjacent beams by applying a predetermined criterion to the comparisons and further applying confidence weights to the identifications of the pairs of adjacent beams, the confidence weight for a pair of beams being the ratio of the signal strengths of the test signals received via the beams of the pair to the sum of the signal strengths of all test signals received by all the beams and use the results of the comparisons and/or correlations to detect the configuration of the connection between the antenna arrangement and transceiver arrangement.

25. A test apparatus according to claim 24, wherein the said criterion is, for a pair of beams not previously identified as adjacent, one has a greater signal strength than all other beams not previously identified as adjacent and the other differs there-from by the smallest amount compared to all other beams not previously identified as adjacent.

26. A test apparatus according to claim 24, comprising repeatedly performing the comparisons of signal strength over a period of time and for multiple different locations of the test signals, and accumulating the weights in association with the identified beams, the accumulated weights indicating the degrees of confidence of the identification of adjacent beams.

27. A test apparatus according to claim 26, comprising using the accumulated weights to identify faults.

28. A test apparatus according to claim 24, wherein the test apparatus is configured to correlate signal strengths.

29. A test apparatus according to claim 24, for use with a base station wherein the sets of beams are associated with respective sectors and the base station is in a mobile telephony network having other base stations and a predetermined frequency re-use scheme, the test apparatus being configured to allocate frequencies to the sectors according to the re-use scheme once the connections of transceivers to the antennas have been identified.

30. A test apparatus according to claim 24, for use with a base station wherein the sets of beams are associated with respective sectors and the base station is in a mobile telephony network having other base stations and a predetermined frequency re-use scheme, the apparatus being configured to detect the handover frequencies of user terminals entering the sectors of the base station from adjacent sectors of one or more adjacent base stations, and allocate to the sectors of the base station frequencies complementary to the detected handover frequencies according to the frequency re-use scheme.

31. A base station comprising a test apparatus according to claim 24.

32. An apparatus for testing a base station for use in a mobile telephony network, the base station having more than three sectors, each sector including at least one antenna coupled to a signal processor, the antennas having respective azimuthal radiation patterns, adjacent antennas having patterns which coincide at cusps, the test apparatus being configured to:
    receive a test signal at the transceiver arrangement;
    determine that the test signal is from a test mobile which is located at the cusp of the azimuthal radiation patterns of adjacent sectors, wherein the determining comprises detecting that the test signal is received at the transceiver arrangement with equal average signal strengths at adjacent diversity pairs of antennas;
    detect, at the signal processors, average signal strengths of the test signal;
    compare the average signal strengths detected at the signal processors; and
    detect one or more fault conditions based on determining that the test signal is from a test mobile which is located at the cusp and comparing the average signal strengths.

\* \* \* \* \*

UNITED STATES PATENT AND TRADEMARK OFFICE
CERTIFICATE OF CORRECTION

| | | |
|---|---|---|
| PATENT NO. | : 8,934,855 B2 | Page 1 of 1 |
| APPLICATION NO. | : 12/269236 | |
| DATED | : January 13, 2015 | |
| INVENTOR(S) | : Gale et al. | |

It is certified that error appears in the above-identified patent and that said Letters Patent is hereby corrected as shown below:

In the Claims:

Claim 24, Column 16, line 67, please delete "beams and" and substitute -- beams; and --

Signed and Sealed this
Twenty-sixth Day of May, 2015

Michelle K. Lee
*Director of the United States Patent and Trademark Office*